(12) United States Patent
Baek et al.

(10) Patent No.: US 7,619,614 B2
(45) Date of Patent: Nov. 17, 2009

(54) THREE-DIMENSIONAL OPTICAL MOUSE SYSTEM

(75) Inventors: Sang Hyune Baek, Suwon (KR); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 827 days.

(21) Appl. No.: 11/341,214

(22) Filed: Jan. 28, 2006

(65) Prior Publication Data

US 2006/0158432 A1 Jul. 20, 2006

Related U.S. Application Data

(63) Continuation-in-part of application No. 11/294,944, filed on Dec. 6, 2005, now Pat. No. 7,212,330, and a continuation-in-part of application No. 11/191,886, filed on Jul. 28, 2005, now Pat. No. 7,095,548, and a continuation-in-part of application No. 11/076,616, filed on Mar. 10, 2005, now Pat. No. 7,274,517, and a continuation-in-part of application No. 11/072,296, filed on Mar. 4, 2005, now abandoned, and a continuation-in-part of application No. 11/072,597, filed on Mar. 4, 2005, now Pat. No. 7,330,297, and a continuation-in-part of application No. 10/983,353, filed on Nov. 8, 2004, now Pat. No. 7,267,447, and a continuation-in-part of application No. 10/979,619, filed on Nov. 2, 2004, and a continuation-in-part of application No. 10/893,039, filed on Jul. 16, 2004, now Pat. No. 7,239,438, and a continuation-in-part of application No. 10/872,241, filed on Jun. 18, 2004, now Pat. No. 7,382,516, and a continuation-in-part of application No. 10/857,280, filed on May 28, 2004, now Pat. No. 6,999,226, and a continuation-in-part of application No. 10/857,714, filed on May 28, 2004, now Pat. No. 7,161,729, and a continuation-in-part of application No. 10/855,715, filed on May 27, 2004, now Pat. No. 7,031,046, and a continuation-in-part of application No. 10/822,414, filed on Apr. 12, 2004, now Pat. No. 7,068,416.

(51) Int. Cl.
*G09G 5/08* (2006.01)
*G06F 3/033* (2006.01)

(52) U.S. Cl. .................. 345/166; 345/108; 345/163; 359/298; 359/290; 359/291; 359/223; 359/318; 359/871; 359/872; 382/313

(58) Field of Classification Search .............. 345/166, 345/108, 163; 359/298, 290, 291, 223, 318, 359/871, 872; 382/312, 313, 314–316
See application file for complete search history.

(56) References Cited

U.S. PATENT DOCUMENTS

| | | | |
|---|---|---|---|
| 2,002,376 A | 5/1935 | Mannheimer | |
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A * | 3/1997 | Vogeley et al. | 348/207.99 |
| 5,696,619 A | 12/1997 | Knipe | |
| 5,881,034 A | 3/1999 | Mano | |
| 5,897,195 A | 4/1999 | Choate | |
| 5,963,197 A | 10/1999 | Bacon | |
| 5,986,811 A * | 11/1999 | Wohlstadter | 359/626 |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin | |
| 6,315,423 B1 | 11/2001 | Yu | |
| 6,329,737 B1 | 12/2001 | Jerman | |
| 6,498,673 B1 | 12/2002 | Frigo | |
| 6,507,366 B1 | 1/2003 | Lee | |

| | | |
|---|---|---|
| 6,509,888 B1 | 1/2003 | Tuovinen |
| 6,549,730 B1 | 4/2003 | Hamada |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,765,555 B2 | 7/2004 | Wu |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,958,777 B1 | 10/2005 | Pine |
| 6,970,284 B1 | 11/2005 | Kim |
| 6,995,909 B1 | 2/2006 | Hayashi |
| 6,999,226 B2 | 2/2006 | Kim |
| 7,023,466 B2 * | 4/2006 | Favalora et al. ............... 348/42 |
| 7,031,046 B2 | 4/2006 | Kim |
| 7,046,447 B2 | 5/2006 | Raber |
| 7,068,416 B2 | 6/2006 | Gim |
| 7,077,523 B2 | 7/2006 | Seo |
| 7,095,548 B1 * | 8/2006 | Cho et al. ................... 359/298 |
| 7,161,729 B2 | 1/2007 | Kim |
| 2002/0018407 A1 | 2/2002 | Komoto |
| 2002/0102102 A1 | 8/2002 | Watanabe |
| 2002/0135673 A1 | 9/2002 | Favalora |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264867 A1 | 12/2005 | Cho |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |

FOREIGN PATENT DOCUMENTS

| | | |
|---|---|---|
| JP | 08-043881 | 2/1996 |
| JP | 11-069209 | 3/1999 |
| JP | 2002-288873 | 10/2002 |

OTHER PUBLICATIONS

James G.Boyd,Gyoungil Cho;Fast response Variable Micromirror Array Lens;SPIE vol. 5055(2003).*

* cited by examiner

*Primary Examiner*—Richard Hjerpe
*Assistant Examiner*—Ishara T Perumpulliarachchige (57) ABSTRACT

A three-dimensional optical mouse device with a Micromirror Array Lens (MMAL) is provided. To have the three-dimensional optical mouse system, a three-dimensional imaging device is used for detecting the motion of optical pointer or fingers of the user and gives a location of the pointer to computer working as a pointing device in three-dimension. This three-dimensional pointing system uses three-dimensional imaging device using MMAL with variable focal length.

22 Claims, 6 Drawing Sheets

THREE-DIMENSIONAL OPTICAL MOUSE SYSTEM

REFERENCE TO RELATED APPLICATIONS

This application is a continuation-in-part of, and claims priority to U.S. patent application Ser. No. 10/822,414 filed Apr. 12, 2004, U.S. patent application Ser. No. 10/855,715 filed May 27 2004, U.S. patent application Ser. No. 10/857,714 filed May 28 2004, U.S. patent application Ser. No. 10/857,280 filed May 28, 2004, U.S. patent application Ser. No. 10/872,241 filed Jun. 18, 2004, U.S. patent application Ser. No. 10/893,039, filed Jul. 16, U.S. patent application Ser. No. 10/979,619 filed Nov. 2, 2004, U.S. patent application Ser. No. 10/983,353 filed Nov. 8, 2004, U.S. patent application Ser. No. 11/072,597 filed Mar. 4, 2005, U.S. patent application Ser. No. 11/072,296 filed Mar. 4, 2005, U.S. patent application Ser. No. 11/076,616 filed Mar. 10, 2005, U.S. patent application Ser. No. 11/191,886 filed Jul. 28, 2005 and U.S. patent application Ser. No. 11/294,944 filed Dec. 6, 2005, all of which are hereby incorporated by reference.

BACKGROUND OF THE INVENTION

Pointing device like a mouse, a trackball, a touchpad, a joystick, and so on is a powerful input tool for a computer system. Pointing device detects user's motion through the mechanical, optical, or electronic or combinations of these techniques. Conventional system usually cannot be used for three-dimensional purpose. Until now, some techniques or devices for three-dimensional pointing device are proposed or commercialized. The followings are some of the examples.

Combining two-dimensional pointing devices with other device such as a keyboard or other pointing device is one method for obtaining the three-dimensional point function. This method is less perceivable and requires a great effort to learn and manipulate. Some other methods are more convenient because these methods use a three-dimensional detecting system.

First example is an acoustic three dimensional positioning method using distance measurement between a microphone source and multiple speakers which transmit ultrasonic signal as described in U.S. Pat. No. 5,963,197. The time delays among the speakers determine the position of the pointing device. This acoustic method can be susceptible to echoes, sound speed variation through different environmental conditions, and ultrasonic interference.

A magnetic three-dimensional positioning method is a very popular one in the virtual-reality environments. Three orthogonal electromagnetic coils generate a magnetic filed in the three-dimensional space and a movable sensor in the pointing device detects the field intensity and gradient to determine the position in the three-dimensional magnetic fields as described in U.S. Pat. No. 6,509,888. Interference between the magnetic fields and other materials around the system makes the exact positioning to be difficult. Even the computer system itself generates a magnetic field and interferes with this kind of pointing device.

Optical three-dimensional positioning method uses multiple image sensors and emitters.

In a pointing device, an object emits or reflects lights so that the image sensors can detect the object. The position is calculated by camera imaging algorithms. One example is direct linear transform which provides three-dimensional positions from two-dimensional image data taken by two-dimensional camera. In this system an image sensor captures ambient images without light sources and the image processing method is applied to determine the relative movement of the object as described in U.S. Pat. No. 6,765,555. Currently available three-dimensional positioning devices discussed above or other methods require some specific environment and a large space due to the multiple transmitters and receivers. These constraints are the major obstacles for the applications of three-dimensional pointing devices for most applications which need a pointing device.

SUMMARY OF THE INVENTION

The present invention provides a three-dimensional optical mouse system which can manipulates the pointer in the three-dimensional space. A camera system images a pointing tool in three-dimensional space for finding the position of the pointing tool. Anything even fingers can be used as a pointing tool in this device. This three-dimensional optical mouse system uses three-dimensional imaging technique using a Micromirror Array Lens (MMAL) with variable focal length, which is described in U.S. patent application Ser. No. 10/822,414.

In three-dimensional optical mouse system, a MMAL with fast response time makes images in the image sensor varying the focal length of the MMAL. These two-dimensional images with depth information determine the three-dimensional position of the pointing tool. Then finally, this three-dimensional position information can be used as an input of the computer device. This device can also extract some other information from the special action of the pointing tool.

The MMAL is so compact that it can be installed in a smallest sized cellular phone. Since the device needs only one image sensor input, the system can be smaller than the multiple emitter or detector system.

Thanks to the fast time response of the MMAL, the three-dimensional optical mouse system can have a fast response time for rapid movements of the pointing tool. The MMAL can track fast moving pointing tool.

Since detecting the position of the pointing tool needs no extra light or ultrasound for indicating the positions of the pointing tool, the pointing tool in the three-dimensional optical mouse system can be wireless and free to move from the electrical connection or the movement constraints.

All the response from the three-dimensional optical mouse system is made by the fast focal length change of the MMAL acting as a variable focal length lens.

The MMAL includes a plurality of micromirrors. The translation and/or rotation of each micromirror of the MMAL are controlled to vary the focal length of the MMAL.

The micromirrors of the MMAL are arranged to form one or more concentric circles.

Each micromirror of the MMAL may have a fan shape to enhance the optical efficiency.

The reflective surface of each micromirror of the MMAL is substantially flat. Alternatively, the reflective surface of each micromirror of the MMAL can have a curvature. The curvature of the micromirrors can be controlled.

Preferably, the reflective surface of the micromirror is made or metal.

Each micromirror of the MMAL is actuated by the electrostatic force and/or electromagnetic force.

The MMAL further includes a plurality of mechanical structures upholding the micromirrors and actuating components for rotating and translating the micromirrors. The mechanical structures and the actuating components are located under the micromirrors for maximize the reflecting surface to enhance the optical efficiency.

Each micromirror has the same function as a mirror. The array of micromirrors works as a reflective focusing lens by making all light scattered from an object converge into a focal plane and meet periodic phase condition among the lights from different micromirrors. In order to perform this procedure, the micromirrors are electrostatically and/or electromagnetically controlled by actuating components to have desired positions. The focal length of the lens is changed by controlling translation of micromirrors, by controlling rotation of micromirrors, or by controlling both translation and rotation of micromirrors.

The MMAL is a spatial light modulator (SLM). The MMAL compensates for phase errors of light introduced by the medium between an object and its image.

The MMAL includes micromirrors and actuating components, and uses a very simple mechanism to control the focal length. The focal length of the MMAL can be changed by translation and/or rotation of each micromirror.

Since micromirror has a tiny mass, the lens comprising the micromirror has a very fast response time down to hundreds of microseconds. The lens also has a large focal length variation and a high optical focusing efficiency. In addition, the lens design makes a large size lens possible, makes the focusing system very simple, and requires low power consumption. The lens has a low production cost because of the advantage of mass productivity.

The MMAL can compensate for aberration. For example, The MMAL can compensate for aberration introduced by the medium between the object and its image and/or a lens system.

The MMAL can have a polar array of micromirrors. For the polar array, each micromirror has a fan shape to increase the optical efficiency by expanding active reflecting region. The aberration of the MMAL can be reduced by micromirrors with curvatures. The optical efficiency of the MMAL can be increased by locating a mechanical structure upholding the micromirror and the actuating components under the micromirror to enhance the optical efficiency by increasing the active area of reflecting surface. Electric circuits to operate the micromirrors can be replaces with know semiconductor technologies such as MOS and CMOS.

The MMAL used in present invention has the following advantages: (1) the MMAL has a very fast response time thanks to the tiny mass of the micromirror; (2) the lens has compactness in size suitable for a portable device such as cellular phone, PDA, and so on; (3) the lens has a large focal length variation because large numerical aperture variations can be achieved by increasing the maximum rotational angle of the micromirror; (4) the lens has a high optical efficiency; (5) the lens can have a large size aperture without losing optical performance. Since the MMAL includes discrete micromirrors, the increase of the lens size does not enlarge the aberration caused by the shape error of a lens; (6) the cost is inexpensive because of the advantage of mass productivity of microelectronics manufacturing technology; (7) the lens can compensate for aberration.; (8) the lens makes the focusing system much simpler; (9) the lens requires small power consumption when electrostatic actuation is used to control it.

The invention of three-dimensional optical mouse system has the following advantages: (1) the system has a very fast response time to track the pointing tool; (2) anything even the finger of the user can be used as a pointing tool; (3) the system has no macroscopic mechanical movement other than the pointing tool movement by the user; (4) the system has a small volume in size; (5) the system has a compact and simple mechanism; (6) the system can distinguish various kinds of the pointing tool; (7) the input action of the system can be anything if the motion is detectable by the image sensor; (8) the system can have high depth resolution; (9) the cost is inexpensive because the MMAL is inexpensive; (10) the system is very simple because there is no macroscopic mechanical displacement or deformation of the lens; (13) the system requires small power consumption since the MMAL is actuated by electrostatic force.

Although the present invention is brief summarized herein, the full understanding of the invention can be obtained by the following drawings, detailed description, and appended claims.

BRIEF DESCRIPTION OF THE DRAWINGS

These and other features, aspects, and advantages of the present invention will become better understood with reference to the accompanying drawings, wherein.

DETAILED DESCRIPTION

Figure 1:
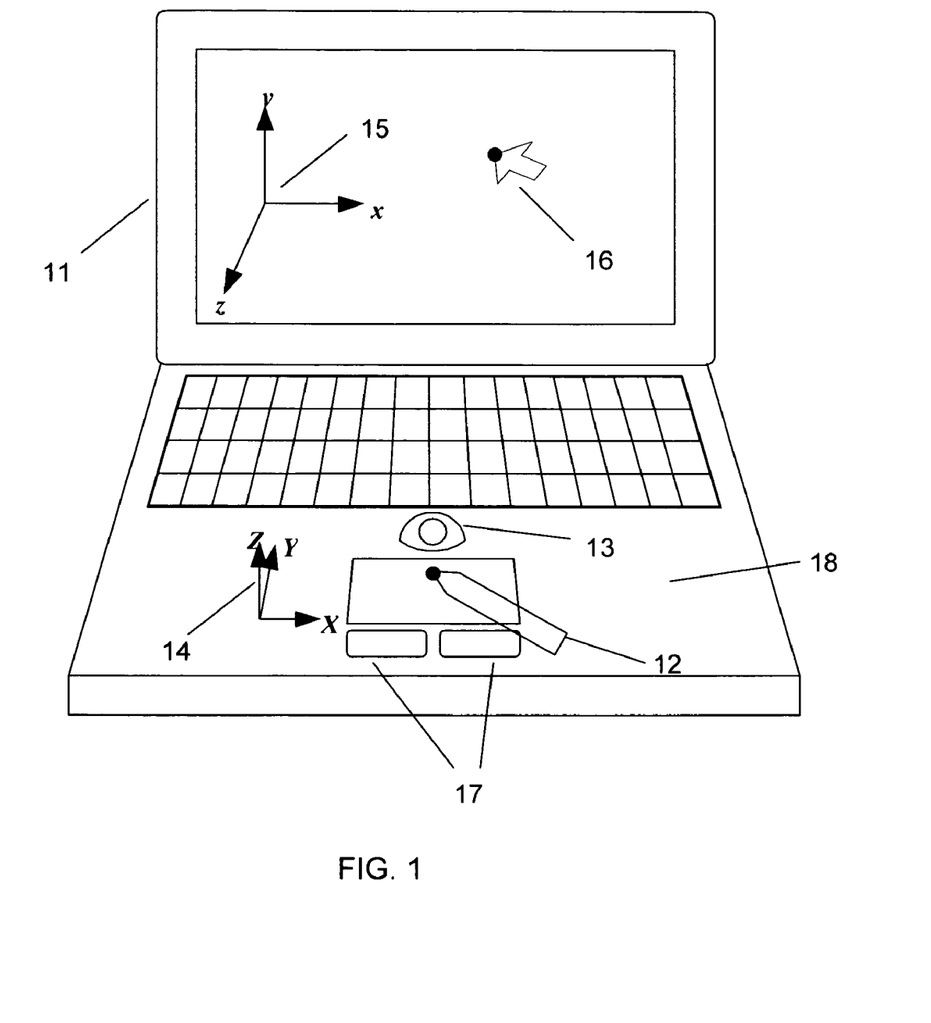
FIG. 1 is a schematic diagram of the three-dimensional optical mouse system with a laptop computer.

FIG. 1 shows a schematic diagram for the three-dimensional optical mouse system with a laptop computer 11. Pointing tool 12 can be moved freely in three-dimensional space to indicate the three-dimensional position in the viewing range of the image detecting device 13. This pointing tool 12 can be any object which can be imaged in the image sensor even user can use his/her finger as a pointing tool 12. Even wireless object can be a pointing tool 12. In the figure, pointing tool is appeared, but anything including finger of the user can be a pointing device for input. Three-dimensional optical mouse system 18 recognize the motions of the pointing tool in real space (X, Y, Z) 14. This point in real space coordinates 14 is converted into the new point 16 in computer operating coordinates 15 system. User can recognize the three-dimensional input by the three-dimensional optical mouse 18 better if the three-dimensional displaying device is used. With the special function keys 17, some pre-programmed actions, such as click, drag, and so on, can be generated. Since the three-dimensional optical mouse system can detect the shape change and the motion of the pointing tool as well as the position, the system can recognize the input signal for special actions by the motion or the shape change of the pointing tool 12.

Since the Micromirror Array Lens (MMAL) with variable focal length can change its optical axis and focal length, the system can find the pointing tool only if it lies in the view of the device. Through the image processing, the system can have three-dimensional imaging and track the motion of the pointing tool.

Figure 2:
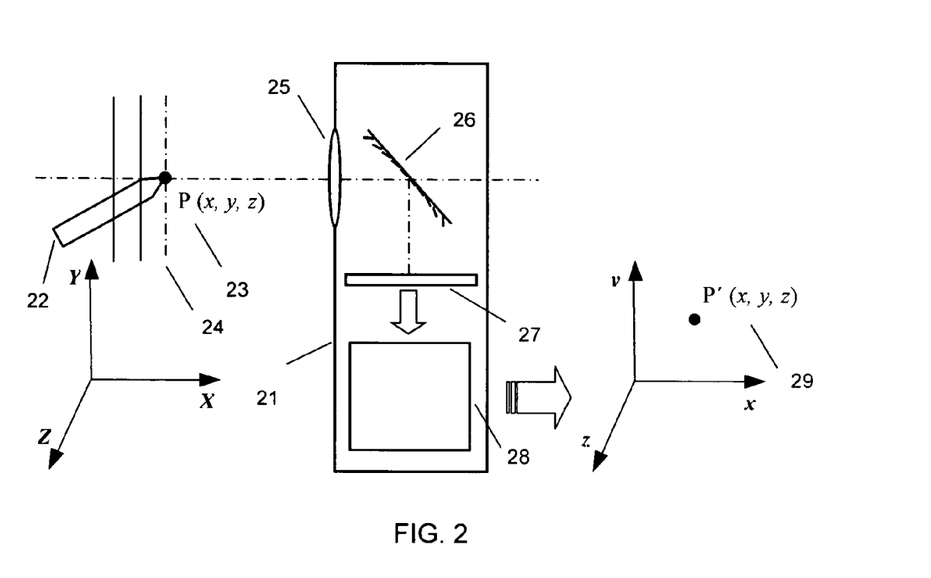
FIG. 2 is a schematic diagram for how the three-dimensional optical mouse system works with a Micromirror Array Lens (MMAL).

FIG. 2 is a schematic diagram which shows how the three-dimensional optical mouse system 21 works with a MMAL with variable focal length 26. The pointing tool 22 moves in the real space indicating the special position P 23. The three-dimensional optical mouse system 21 images two-dimensional images of the pointing tool 22 varying focal length of the MMAL. The depth information and in-plane position information are obtained by image processing of the two-dimensional images. The auxiliary lens 25 can be used to adjust the numerical aperture and focal length of the imaging system. The two dimensional images with the depth information are captured by the image sensor 27 and the processing unit 28 finds the distance from the imaging unit to the pointing tool and obtains three-dimensional information of the pointing tool by calculating the focal plane of the in-focused images as described in U.S. patent application Ser. No. 10/822,414. Then finally, the processing unit 28 gives the computer operating coordinates 29 to the computer.

Figure 3:
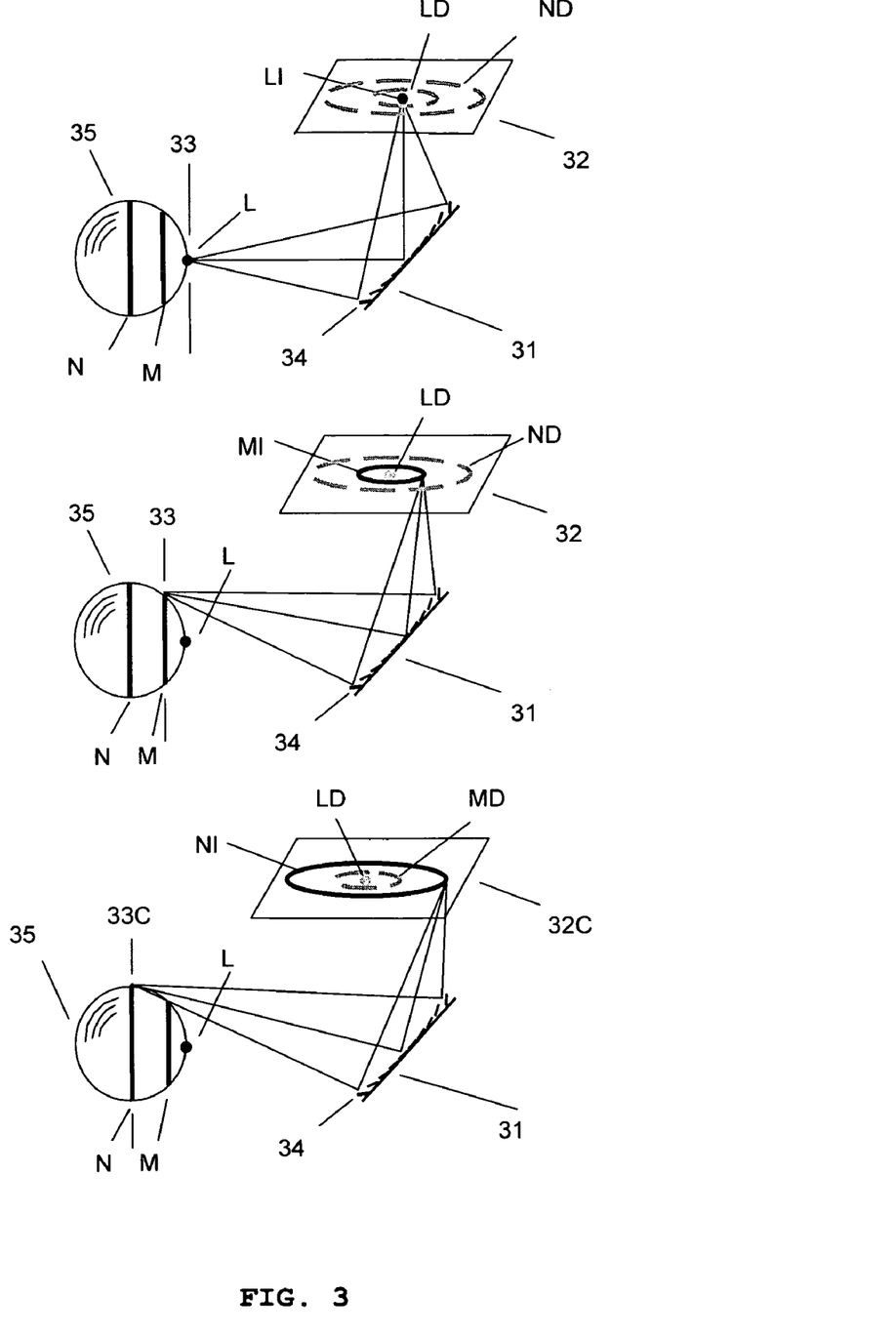
FIG. 3 shows the principle of the MMAL.

FIG. 3 shows how a MMAL 31 takes two-dimensional images 32A, 32B, 32C with the focal planes 33A, 33B, 33C changing the focal length of the MMAL 31. The MMAL 31 includes many micromirrors 34. The focal length of the MMAL 31 is changed by rotation and translation of each micromirror 34 by electrostatic and/or electromagnetic force. Two-dimensional images 32A, 32B, 32C are taken with the depth information which corresponds to the position of the focal plane 33A, 33B, 33C. The two-dimensional image 32A has in-focus image LI at the focal plane 33A, which is the image of the portion L of an object 35. Images MD, ND of portion M, N of an object 35 are defocused. The image processing unit determines the in-focus pixels LI from the two-dimensional images 32A. The first two-dimensional image 32A gives in-focus pixels LI with the depth information of the focal plane 33A. The two-dimensional images 32B, 32C with the second and third focal plane 33B, 33C are processed in the same manner as the first focal plane to get in-focus images with depth information.

Figure 4:
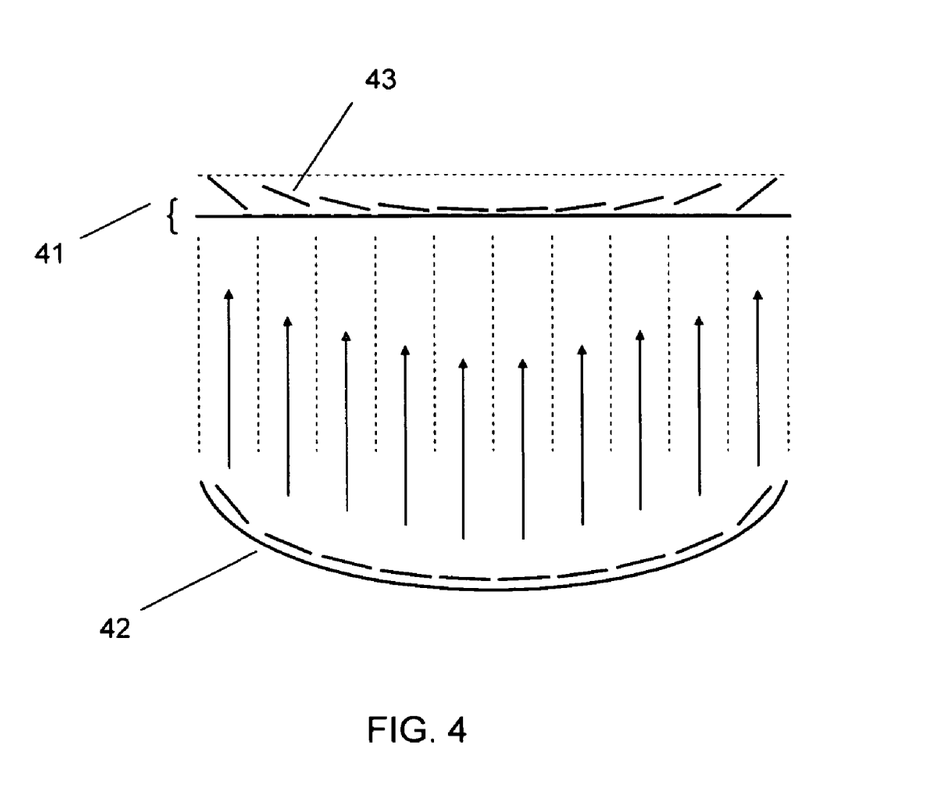
FIG. 4 is a schematic plan view showing the structure of the lens that is made of many micromirrors and actuating components.

FIG. 4 shows the principle of a MMAL 41. It has a plurality of micromirrors and by controlling the micromirrors, focal length can be changed. Two conditions should be satisfied to build a perfect lens. One is a converging condition that all light scattered by one point of an object should converge into one point of the image plane. The other is the same phase condition that all the converging light at the image plane should have the same phase. To satisfy the perfect lens conditions, the surface shape of conventional reflective lens 42 reflects all the incident light scattered from one point of an object to one point on the image plane with the same optical path length traveled. Thanks to the periodicity of the light phase, the same phase condition can be satisfied even though the optical path length of the converging light is different. When the difference of the optical path length is exactly the same with the multiples of wavelength, the reflected beam at the focus meets the phase condition. Therefore, the surface shape of the conventional reflective lens 42 satisfying perfect lens conditions can be replaced by rotation and translation of micromirrors. Each micromirror 43 rotates to converge into focal point and translates to adjust the phase between the reflected lights from different micromirrors 43.

Figure 5:
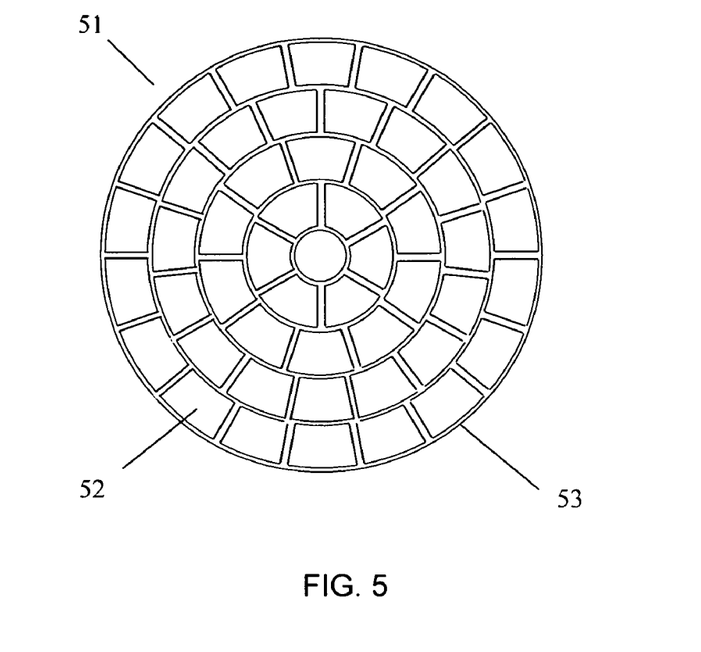
FIG. 5 is a schematic diagram showing how a MMAL works as a lens.

FIG. 5 illustrates the two-dimensional view of a MMAL 51. Each micromirror 52 of the MMAL 51 is controlled by electrostatic and/or electromagnetic force made by actuating components 53. Because a lens is axis-symmetric, the MMAL 51 can have a polar array of the micromirrors 52. Each of the micromirrors 52 can have a fan shape to maximize the effective reflecting area and increase the optical efficiency.

The mechanical structures upholding each micromirror and the actuating components to rotate and translate the micromirrors 52 are located under the micromirrors 52 so that the micromirrors 52 have larger active area.

Figure 6:
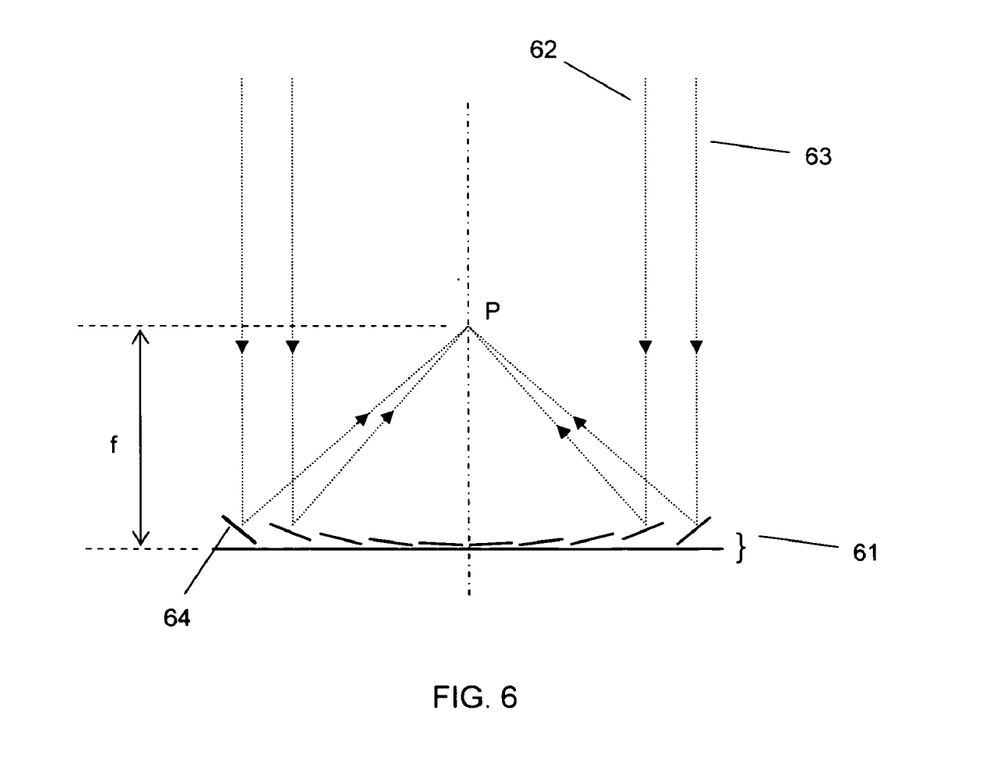
FIG. 6 is a schematic diagram showing the three-dimensional imaging device using an auxiliary lens.

FIG. 6 illustrates how the MMAL 61 makes an image. Arbitrary scattered lights 62, 63 from the object are converged into one point P on the image plane by controlling the position of each of the micromirrors 64. Phases of individual lights 62, 63 can be adjusted to have the same value by translating each of the micromirrors 64. The required translational displacement is at least half of the wavelength of light.

The focal length f of the MMAL 61 is adjustable by controlling the rotation and/or translation of the micromirror 64. The operation of the MMAL 61 is possible by controlling only rotation regardless of the phase condition. In this case, the quality of the image generated by the MMAL is degraded by the aberration. Also translation only without rotation can form a Fresnel diffraction lens with the aberration. The smaller the sizes of the micromirrors 64 can reduce the aberration. Even though the focusing ability of the one motion by either rotation or translation is not powerful, the lens with one motion has the advantage of simple control and fabrication.

Since the ideal shape of the conventional lens 62 has a curvature even in the small size of the micromirror, it is strongly desired that each of the micromirrors 64 has a curvature itself. However, since the aberration of the lens with flat micromirrors 64 is not much different from the lens with curvature if the size of each micromirror is small enough, there is not much need to control the curvature.

Figure 7:
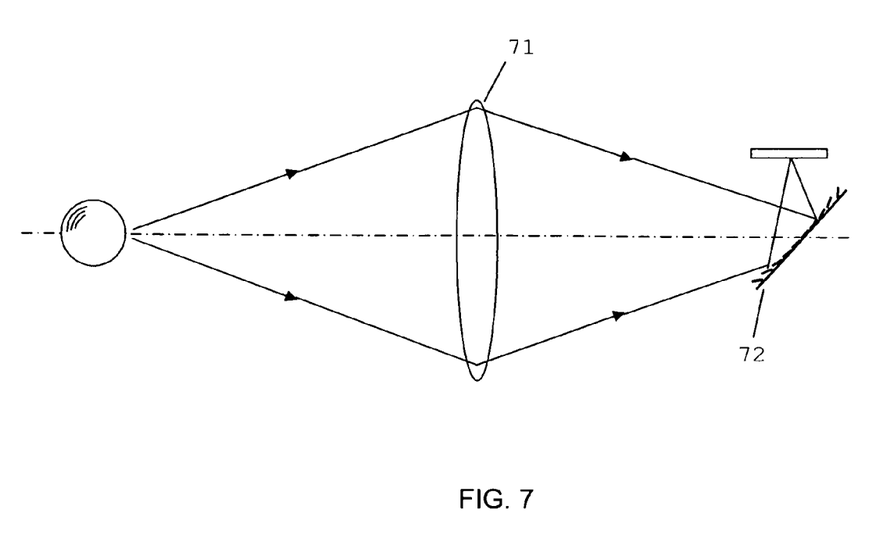

FIG. 7 shows that an effective focal length and numerical aperture of the MMAL 72 combined with an auxiliary lens 71 or lenses can have extended numerical aperture and effective focal length. The fast response of the MMAL enables the process for finding the focus of the pointing tool instantaneous. Image processing unit processes the taken two-dimensional image to determine whether the object image lies on the focus or not. The tracking of the pointing tool can be accomplished by the fast response of the MMAL.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A three-dimensional optical mouse system comprising:
   a) an imaging unit comprising a Micromirror Array Lens (MMAL) with variable focal length;
   b) an image processing unit.

2. The three-dimensional optical mouse system of claim 1, wherein the mouse system has a pointing tool for indicating the three-dimensional position.

3. The three-dimensional optical mouse system of claim 2, wherein the pointing tool can be any object which can be imaged in the image sensor.

4. The three-dimensional optical mouse system of claim 2, wherein the pointing tool is user's finger.

5. The three-dimensional optical mouse system of claim 2, wherein the pointing tool is a wireless object.

6. The three-dimensional optical mouse system of claim 1, wherein the three-dimensional optical mouse system comprises a button or buttons for special action.

7. The three-dimensional optical mouse system of claim 2, wherein the pointing tool can have a special action or actions by the motion of the pointing tool without having a button.

8. The three-dimensional optical mouse system of claim 7, wherein the motion for special action can be any motion in the viewing range of the image sensor.

9. The three-dimensional optical mouse system of claim 1, wherein the mouse system has an image processing unit to find distance from the imaging unit to the object.

10. The three-dimensional optical mouse system of claim 9, wherein the image processing unit obtains three-dimensional information of the pointing tool.

11. The three-dimensional optical mouse system of claim 2, wherein the three-dimensional optical mouse system can track the motion of the pointing tool.

12. The three-dimensional optical mouse system of claim 1, the three-dimensional optical mouse system can detect the shape change.

13. The three-dimensional optical mouse system of claim 1, wherein the MMAL comprises a plurality of micromirrors.

14. The three-dimensional optical mouse system of claim 13, wherein each of the micromirrors is controlled to change the focal length of the MMAL.

15. The three-dimensional optical mouse system of claim 13, wherein each micromirror of the MMAL is actuated by electrostatic force.

16. The three-dimensional optical mouse system of claim 13, wherein each micromirror of the MMAL is actuated by electrostatic and electromagnetic force.

17. The three-dimensional optical mouse system of claim 13, wherein the surface of each of the micromirror is made of metal.

18. The three-dimensional optical mouse system of claim 1, wherein the MMAL corrects aberrations.

19. The three-dimensional optical mouse system of claim 18, wherein the MMAL corrects the defects of the imaging unit.

20. The three-dimensional optical mouse system of claim 1, wherein an object which does not lie on the optical axis can be imaged by the MMAL without macroscopic mechanical movement.

21. The three-dimensional optical mouse system of claim 1, wherein further comprising one or more auxiliary lenses having a predetermined focal length, and wherein the effective focal length of the imaging unit determined by the MMAL and the auxiliary lens together.

22. The three-dimensional optical mouse system of claim 1, wherein further comprising one or more auxiliary lenses having a predetermined focal length, and wherein the numerical aperture of the imaging unit is increased by the auxiliary lens.

* * * * *